July 4, 1950   M. S. ROSEN   2,514,260
CLINICAL TESTING DEVICE FOR BLOOD
Filed Sept. 19, 1946
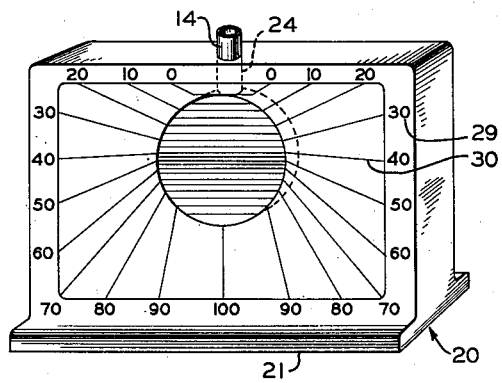
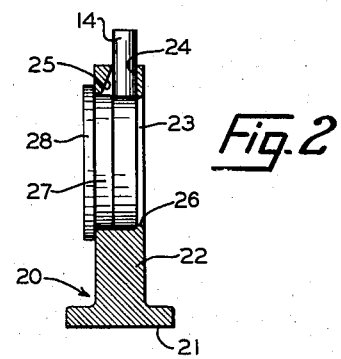
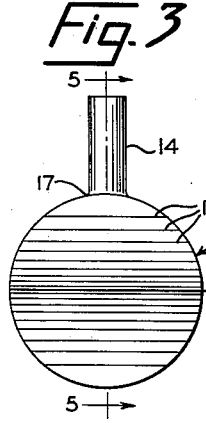
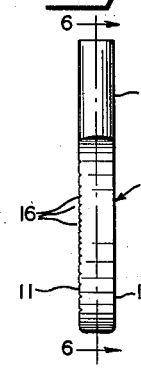
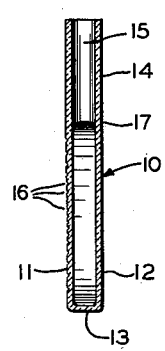
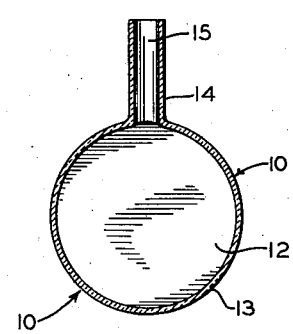
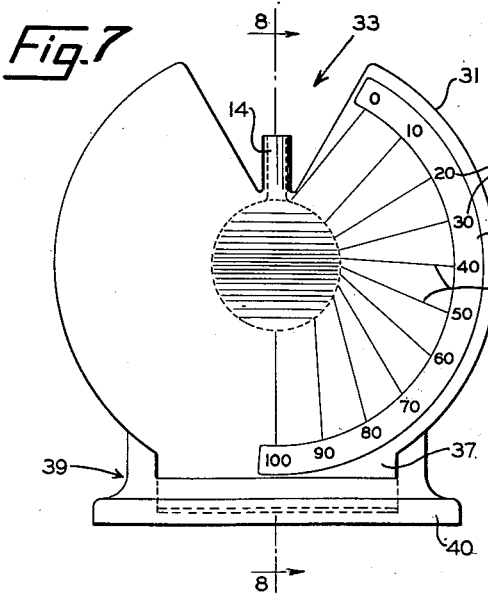
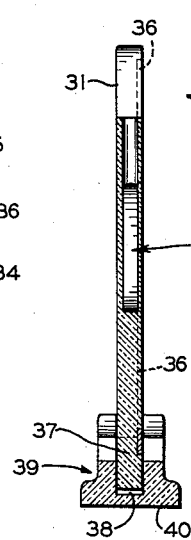
INVENTOR
MAURICE S. ROSEN
BY John M Graham
ATTORNEY Patented July 4, 1950

2,514,260

UNITED STATES PATENT OFFICE 2,514,260

CLINICAL TESTING DEVICE FOR BLOOD

Maurice S. Rosen, New York, N. Y., assignor to Haemic Research Laboratories, Inc., New York, N. Y., a corporation of New York Application September 19, 1946, Serial No. 697,878

14 Claims. (Cl. 73—61)

This invention relates to devices for use in the clinical testing of certain body-fluids containing organic materials, such as blood, and is more particularly concerned with determining the rate of sedimentation of the solid particles in a fluid menstruum such as the erythrocyte sedimentation rate of any blood or fluid containing blood.

Sedimentation tests to determine rate of fall of the solid particles through the menstruum, on standing have been found useful particularly in diagnosis of human ailments and particularly the erythrocyte (red blood cell) tests is accepted by the medical profession as an important aid in the diagnosis of certain inflammatory degenerative and anemic states of the human circulatory system, and also in pregnancy. The value of such sedimentation tests is also known in following such diseases and conditions during their treatment, as an aid to gauge the results being achieved.

Heretofore, sedimentation tests of this nature, and particularly the erythrocyte sedimentation tests, have been carried out under conditions that a protracted time is needed to obtain the results, sometimes as much as twenty-four hours being needed before the results are conclusive enough to be utilized in diagnosis or prognosis thereby somewhat reducing the usefulness of the tests particularly in those cases where a more immediate determination of sedimentation rate would be of advantage. Because of this length of time, the clinician has the choice of delaying the determination of his tests or proceeding as is quite usual, to carry out what is called a one-hour test of sedimentation. This one-hour sedimentation rate test as used by many clinicians today has been found inadequate and incompletely informative as it presents only a partial sedimentation picture of the specimen tested.

The one-hour test therefore as heretofore practiced, while possessing the advantage of short time of the test, fails as a true indication of sedimentation rates of materials of the type referred to, giving the clinician a choice between partial and uncompletely informative results in a short space of time, or completely informative results in an unduly long and protracted test.

It is the object therefore of the present invention to provide means whereby a completely informative sedimentation rate can be produced in a much shorter time than heretofore possible when carrying out the test to substantially final sedimentation values, providing thereby information based upon the total sedimentation capacity of the blood sample in a sufficiently short time to be practical, thus rendering such tests of greater value in diagnostic and prognostic procedures.

It is a further object of the invention to provide a device for sedimentation tests of the types referred to, which will give rapid results and permit accurate and easy readings of the sedimentation rate. Further objects of the invention are to provide a device for sedimentation tests of the type referred to in which the use thereof may be dispensed with after the test, thereby saving the usual time and effort to carefully cleanse the device used; to provide a solid steady support for the fluid container which will also permit ready and easy readings of sedimentation level; and to provide an accurate sedimentation testing device for diagnostic and like work which will give repeated constant results permitting a check or control of prognosis and comparison as well as classification of varied results on different types of fluids and different types of patients.

Generally, in procedures heretofore used for sedimentation tests such as tests for erythrocyte sedimentation, a portion of fluid, such as blood, have been introduced into a tube of substantially equal cross section through the length of the tube relative to its inside diameter having been calculated for a predetermined volume. The tube is held in vertical position and the sedimentation volume is noted at regular intervals, the tube being marked as by etching, to permit this noting of volumes. In using such prior procedure as much time as 24 hours may be needed before final settling of the sediment is achieved and in no case is it usual to obtain a result before several hours have passed, even when using a fluid from which the sediment settles easily.

In the so-called one-hour test the amount of settling of the sediment is noted at desired intervals up to the one-hour limit, but the results are incompletely informative since in that period of time there is not much settling and the conditions thereof are in no way indicative of the performance of settling as this proceeds from original unsettled condition to a final settling over the extended period of time heretofore needed.

In contradiction thereto, the present invention provides a container for the fluid such as blood, in a different form or shape and made of any desired transparent material, such as glass or plastic. The container is preferably formed as a segment of a cylinder having two parallel circular planes or discs connected at their perimeters by a narrow cylindrical band or rim, and is provided with a circular opening placed at one point on the narrow band to permit filling. Preferably, a short tube connects with said opening of the same internal diameter as the width of the space between said planes, thereby facilitating actual filling of the chamber formed by the discs and circular rim. The container may be marked on one or both of its plane faces, on the outside thereof, with suitable indices, such as parallel horizontal lines, marking the relative volumes and numerals may be placed upon said lines to further assist identification. The container is filled with, for instance, blood in such manner that the whole of the volume within and between the parallel circular planes is occupied and thereafter it is placed in a steady position with the filling tube upright. Observations are made at short time intervals and it is found that total settling occurs in a relatively short time, being a fraction of the time heretofore needed by prior procedures.

If desired, the container may be mounted in a suitable holder, which may be marked in such manner as to facilitate reading the levels of settling. Alternatively, the container may be formed integrally with a fan formation, up which indices are carried to render reading easier, it being borne in mind that the actual diameter of the disc shaped container may be only one inch, for instance, thus making direct readings thereon somewhat difficult.

Reference will now be made to the accompanying drawings, which illustrate one embodiment of the invention, and together with the description, serve to explain the principles of the invention.

Of the drawings:

Fig. 1 is a perspective view of the container according to the invention mounted in one form of stand or support;

Fig. 2 is a side view of the device of Fig. 1 with parts shown in section;

Fig. 3 is an enlarged elevation of the container according to this invention;

Fig. 4 is a side elevation of the container of Fig. 3;

Fig. 5 is a cross-sectional view of the container, on the lines 5—5 of Fig. 3;

Fig. 6 is a cross-sectional view of the container, on the line 6—6 of Fig. 4;

Fig. 7 is an elevation of a modified form of container and stand or support; and Fig. 8 is a cross-section of the device of Fig. 7 on the line 8—8 of Fig. 7.

Referring specifically to Figs. 3 to 6 of the drawings, which illustrate the transparent container of the present invention, it will be seen that the container 10 is constituted of side walls 11 and 12 in parallel planes and an annular wall or rim 13 connecting the peripheries of side walls 11 and 12. The container may be formed by blowing said shape when using glass, molding a transparent plastic material, or bonding suitable disc forming walls 11 and 12 with a rim forming wall 13. A filling tube 14 is provided connecting with annular wall 13 having a bore 15 which is formed of the same diameter as the distance between the inner faces of walls 11 and 12, as shown in Fig. 5. Across one face of container 10 as formed by the external face of wall 11, for example, there are arranged a plurality of parallel indices 16 which may be etched into the glass, plastic or like transparent material used for container 10. It will be noted from Fig. 3 that the indices 16 are not equidistantly spaced but are spaced actually with respect to the volume of each sector, namely the horizontal lines forming indices 16 denote volumes of contents and thus indicate the levels of the various volumes of settled material on the diameters represented thereby, whereby the said lines are progressively spaced closed together as they approach the center line or equator 18 and recede from each other to form wide spacing as they approach the lower end of the cylindrical container and the neck-line 17.

When the container 10 has been filled to its neck-line 17 by means of tube 14, same is placed in a suitable holder with the tube 14 vertically upright and is left undisturbed for a short period. When whole blood is used in the testing device after a very few minutes a change will be noticed since the erythrocytes (red blood cells) will flow downwardly through the plasma which latter will rise. The constantly increasing volume toward the equator 18 of the container affords improved facilities for this rise of plasma and fall of erythrocytes resulting in so rapidly a settling of the erythrocytes that in 15 minutes in most cases, a settling has been caused sufficient for significant results that are readable, reliable and comparable. It has been found that for various types of blood the 15 minute reading shows from 7.1 percent to 30.5 percent of total fall, whereas in prior procedures, only a slight, and in some cases, no more than a barely readable result has been experienced in this 15 minute period. Depending upon the type of blood, the readings therefore are started in a time less than 15 minutes from placing the filled container 10 in a vertical position and thereafter, at regular intervals of time, the amount of settling, which is readily discernible to the eye, is noted and a suitable graph may be plotted of time against volume of settled erythrocytes. Final settling is rarely more than one hour with the device of the present invention and does not proceed beyond 2 hours, so that the tests can be completed by a physician, for instance in an office visit, as against prior practice requiring at least 24 hours for this test.

In view of the fact that there are usually twenty indices 16 on the face of container 10, sometimes this is hard to clearly read the volume changes, particularly as the equator 18 is approached. Also it is necessary to have the container standing firmly and in a vertical and constant position. To this end, as shown in Figs. 1 and 2, a stand or holder 20 is provided for the container 10 which both secures the container in vertical position at all times, and renders the reading of the indices more easy and accurate.

Holder 20 is formed of any suitable material but may be made of glass, plastic or like material, which is capable of sterilization by boiling, for instance. A large base 21 is formed integrally with an upright portion 22 which is bored as at 23 to a diameter slightly greater than the outside diameter of a container 10, whereby a container may be inserted into the bore from one side, the tube 21 being passed through a hole 24 in the top of the upright 22 provided to snugly accommodate the tube. To permit easy insertion of a filled container 10 into position, hole 24 is tapered on its rear side as at 25 (Fig. 2) to necessitate only a small amount of tipping of the container in order to enter tube 14 into hole 24. A flange or abutment 26 on the front edge of bore 23 serves as a stop to seat one face of the container 10 in position, and a plug 27 is inserted into the rear side of bore 23, as shown in Fig. 2, to hold the container 10 against flange 26 and thus in a position which is uniform for all containers 10, and constant. Plug 27 may have an enlarged section 28 as a hand grip, and suitably may have only a friction grip contact with its bore 23, since there is little need for other than a small pressure against the container 10 into contact with flange 26 to maintain it in place. As shown in Fig. 1, hole 24 maintains tube 14 in vertical position and in a position such that all containers 10 used with holder 20 will be uniformly placed. Numerals identified at 29, in progressive order of tens from zero to one hundred, with divergent lead lines 30 are arranged on the front face of holder 20, and these lead-lines are led around the curved face of flange 26 to bring them into close proximity with the face of container 10. By this means indices 16 on container 10 of Fig. 3 may be dispensed with, if desired, or may equally be utilized therewith. The advantages resultant of removing indices 16 from container 10 is mainly a reduction of cost, since it is known that any device to be used for testing blood must be thoroughly cleansed and sterilized by a lengthy and tedious method, so that, if containers 10 were of such low cost that they could be discarded with after a single use, a great savings in time and effort is achieved.

By utilizing diverging lead-lines 30 leading to indices 29 on the face of holder 20, easier readings are obtained and this result can be further helped by forming opaque lead-lines 30 on a transparent body for holder 20 and illuminating the device from the rear in any desired manner. With the device of Figs. 1 and 2 therefore, a discardable container 10 of cheaper form to manufacture, as made without indices 16, may be utilized with provision of easy and accurate readings of falling of sediment by virtue of indices 29.

However, it may be desired to form the container 10 itself with means for more easy and accurate reading than is possible with indices 16 alone. To this end, a modified form of container is provided as shown in Figs. 7 and 8.

Container 10 thereof is provided with a fan-shaped surrounding piece 31 which is formed integrally with container 10. To facilitate filling container 10 through tube 14 a V-shaped portion shown at 33 is cut-away at the upper part of fan piece 31. Across the face of container 10, indices 16, as in Fig. 3, are marked and, in order to render these more easily capable of observation and calibration a number of lead-lines 34 etched or otherwise applied to the front face of fan 31 diverge from indices 16 and lead to numerals 35 in progressive order of tens from zero to one hundred marked on the band 36 on fan 31 in such spaced apart relation as to be readily readable. Fan 31 terminates in a foot 37 which can be placed in a slot 38 in a suitable holder 39, the holder having a heavy base 40 to secure the fan 31 in a firm, steady position for taking the readings during the sedimentation tests.

In using the devices illustrated, the container 10 is filled to the neck-line 17 of Fig. 3, with the body-fluid to be tested, and when using blood or blood-containing fluids, means to render same in-coagulatable are added such as potassium or ammonium oxalate and thereafter the container is placed in its holder, either as in Fig. 1 or as in Fig. 7. After a period of time such as fifteen minutes, a reading is taken of the level of the settling solids, such as erythocytes, this being readily observable to the human eye, and thereafter at intervals of time, say five minutes, the further settling is noted, utilizing for easy observation the divergent lead-lines on the face of the holders disclosed. After about one hour, no more settling will be observed except in cases of unusual blood or like fluid and after two hours even such unusual samples will be finally settled. By plotting a graph or like coordination of the time against the amount of settling observed, there is provided a complete picture of this sedimentation-rate of the blood or like fluid sample which obviously can be used in both diagnosis and prognosis, placing in the physician's hands a further clinical test which can be carried out quickly, accurately and uniformly to help him in his work. It should be realized that both sides of the container 10 may be etched or likewise marked with the horizontal level indicating lines or indices 16, and also that the holder 20 or the fan 31 can be so marked on both faces with numerals and indices, whereby the device may be used from either side.

The invention in its broad aspects is not limited to the specific mechanisms shown and described but departures may be made therefrom within the scope of the accompanying claims without departing from the principles of the invention and without sacrificing its chief advantages.

What is claimed is:

1. For use in determining the sedimentation rate of a body fluid containing solid organic material, a container comprising two parallel circular discs connected at their peripheries by a cylindrical band, a circular opening located at one point on said band, and a short tube connected with said opening to facilitate filling of the space between said discs and said band, one face at least of a disc having indices thereon, to permit reading of volumes of sediment settling within the container.

2. For use in determining the sedimentation rate of a body fluid containing solid organic material, a container comprising two parallel circular discs connected at their peripheries by a narrow cylindrical band, a circular opening located at one point on said band, and horizontal parallel markings on an outside face of one of said discs as indicators of the level of settling of sediment within the container.

3. For use in determining the sedimentation rate of a body fluid containing solid organic material, a container comprising two parallel circular discs connected at their peripheries by a narrow cylindrical band, a circular opening located at one point on said band, and horizontal parallel markings on an outside face of one of said discs as indicators of the level of settling of sediment within the container, said markings being formed as lines running the width of said face and being spaced apart a variable amount indicative of equal volumes of body fluid for each section so identified.

4. A device for use in determining the sedimentation rate of the solids in a body-fluid comprising in combination a container for the body-fluid having an internal chamber formed between two parallel circular plane surfaces and a peripheral cylindrical surface, a filling tube communicating with said chamber and means for supporting said container in vertical position comprising an apertured holder into which aperture the cylindrical portion of said container is placed, an abutment at one edge of said aperture against which a plane face of said container is pressed, and a plug adapted to enter said aperture behind said container to cause said pressing action on said container.

5. For erythrocyte sedimentation determination, a support for holding a blood sample container comprising an upright stand horizontally bored to receive the container and carrying level defining indices on its face adapted to cooperate with said container when supported by said stand to clearly indicate the levels of sedimentation reached.

6. A device for use in determining the sedimentation rate of a body fluid containing solid organic material comprising in combination a container for the body fluid comprising a pair of parallel circular discs and a connecting cylindrical rim, a filling tube communicating with the chamber thus formed, a fan-shaped member integral with said container, indices on said container indicating levels of settling of said solid organic material, radiant marking lines upon said fan-shaped member communicating with said indices at one end, a plurality of numerals on the rim of said fan-shaped member spaced apart for easy visual reading and communicating with the other end of said marking lines, and a stand into which said fan-shaped member may be removably placed, to maintain said fan-shaped member and container in a vertical upright position.

7. A device for use in determining the sedimentation rate of a body fluid containing solid organic material comprising in combination a container for the body fluid comprising a pair of parallel circular discs and a connecting cylindrical rim, a filling tube communicating with the chamber thus formed, a fan-shaped member formed integrally with said container, indices on said container for indication of levels of settling of said solid organic material, radiant marking lines upon said fan-shaped member communicating with said indices at one end, and a plurality of numerals on the rim of said fan-shaped member spaced apart for easy visual reading and communicating with the other end of said marking lines.

8. A device for use in determining the sedimentation rate of a body fluid containing solid organic material comprising in combination a container for the body fluid comprising a pair of parallel circular discs and a connecting cylindrical rim, a filling tube communicating with the chamber thus formed, a fan-shaped support formed integrally with an surrounding said container, indices on said container indicating levels of settling of said solid organic material, and radiant marking lines upon said fan-shaped support with said indices at one end.

9. A device for determining the erythrocyte sedimentation rate of a blood fluid sample comprising an upright stand, there being a horizontal cylindrical bore through said stand, a flange at one edge of said bore where it terminates in a face of said stand, said stand having radiant marking lines on its face diverging to the outer edges of said stand with numerical indices at said outer edges indicating the values of said marking lines, there being a vertical hole in said stand adapted to communicate with said bore at its uppermost point and passing upwardly through said stand, a container for said sample formed as a segment of a cylinder of diameter substantially equal to the diameter of said bore and enterable into said bore, a filling tube formed with said container and communicating with the interior thereof, said filling tube being capable of passing through said vertical hole when said container is in position in said bore, to maintain same in vertical position, said container when filled being introduced into said bore and pressed against said flange, thereby permitting readings by said diverging lines of the settling of erythrocytes from time to time, means being provided to cause said container to be positively held against said flange, said means comprising a friction-grip plug introduced into friction contact with said bore after entry of said container and bearing against said container.

10. A device for determining the erythrocyte sedimentation rate of a blood fluid sample comprising an upright stand, there being a horizontal cylindrical bore through said stand, a flange at one edge of said bore where it terminates in a face of said stand, said stand having radiant marking lines on said face diverging to the outer edges of said stand, together with numerical indices at said outer edges indicating the values of said marking lines, there being a vertical hole communicating with said bore at its uppermost point and passing upwardly through said stand, a container for said sample formed as a segment of a cylinder of diameter substantially equal to the diameter of said bore and enterable into said bore, a filling tube formed with said container and communicating with the interior thereof, said filling tube being capable of passing through said vertical hole when said container is in position in said bore, to maintain same in vertical position, said container when filled being introduced into said bore and pressed against said flange, thereby permitting readings by said diverging lines of the settling of erythrocytes from time to time.

11. A device for determining the erythrocyte sedimentation rate of a blood fluid sample comprising an upright stand, there being a horizontal cylindrical bore through said stand, a flange at one edge of said bore where it terminates in a face of said stand, said stand having radiant marking lines on said face diverging to the outer edges of said stand, together with numerical indices at said outer edges indicating the values of said marking lines, a container for said sample formed as a segment of a cylinder of diameter slightly less than the diameter of said bore and enterable into said bore, said container when filled being introduced into said bore and pressed against said flange, thereby permitting readings by said diverging lines of the settling of erythrocytes from time to time, means being provided to cause said container to be positively held against said flange, said means comprising a friction-grip plug introduced into friction contact with said bore after entry of said container and bearing against said container.

12. A device for determining the sedimentation rate of solids in body fluid samples comprising in combination a container for the sample formed as a segment of a cylinder with two parallel circular planes connected at their peripheries by a cylindrical rim, an upright stand, there being a horizontal bore therethrough to receive said container and hold same during standing for sedimentation determination, said stand having indices upon said stand communicating with indices upon said container for indicating the progressively rising level of solids in said sample during standing, said indices upon said stand diverging outwardly away from each other as they recede from the indices on said container, to render easier the visual observance and recording of sedimentation levels.

13. A device for determining the sedimentation rate of solids in body fluid samples comprising in combination a container for the sample formed as a segment of a cylinder with two parallel circular planes connected at their peripheries by a cylindrical rim, an upright stand, there being a horizontal bore through said stand to receive said container and hold same during standing for sedimentation determination, and indices upon said stand for indicating the progressively rising level of solids in said sample during standing.

14. Apparatus for determining the sedimentation rate of a body fluid containing solid organic material comprising in combination a container formed of two parallel circular discs of transparent material connected at their peripheries by a narrow cylindrical band, a circular opening located at one point on said band and a short tube connected with said opening to facilitate filling of the interior of the container, said tube having an internal diameter equal to the width of the space between the inside faces of said discs; and a stand supporting said container in upright position, said stand having radiant marking lines on one face diverging to the outer edges of said stand, together with numerical indices at said outer edges to indicate the value of said marking lines, and said container having horizontal indices on one face thereof the ends of which communicate with the inner ends of said diverging marking lines.

MAURICE S. ROSEN.

REFERENCES CITED

The following references are of record in the file of this patent:

UNITED STATES PATENTS

| Number | Name | Date |
|---|---|---|
| 345,106 | Brayton | July 6, 1886 |
| 955,091 | Myers | Apr. 12, 1910 |
| 2,104,525 | Proskouriakoff | Jan. 4, 1938 |
| 2,163,000 | Goodhue et al. | June 20, 1939 |
| 2,372,872 | Wolper | Apr. 3, 1945 |

OTHER REFERENCES

Modern Laboratory Appliances Catalogue, by Eimer and Amend, 633-635 Greenwich St., New York, N. Y. Copyright 1942, p. 611, article No. 11-988, Transparent Fused Quartz Cell.